United States Patent [19]
Gordon

[11] 3,796,277
[45] Mar. 12, 1974

[54] RIDING TRACTOR WITH ENGINE ENCLOSURE FOR NOISE ABATEMENT

[75] Inventor: Douglas Gordon, Hartford, Wis.

[73] Assignee: Briggs & Stratton Corporation, Wauwatosa, Wis.

[22] Filed: July 28, 1972

[21] Appl. No.: 276,246

[52] U.S. Cl............ 180/54 A, 180/69 R, 181/33 K
[51] Int. Cl............................................. B60k 11/06
[58] Field of Search.... 180/54 A, 64 A, 69 R, 54 E, 180/54 R; 181/33 K; 55/502

[56] References Cited
UNITED STATES PATENTS

| | | | |
|---|---|---|---|
| 3,147,814 | 9/1964 | Suhre................................ | 180/54 A |
| 2,999,562 | 9/1961 | Lechtenberg........................ | 55/502 |
| 2,701,024 | 2/1955 | Thomas........................ | 180/54 A X |
| 2,529,995 | 11/1950 | Brezek.............................. | 180/54 A |
| 3,096,843 | 7/1963 | Giacosa ........................... | 180/54 A |
| 3,669,203 | 6/1972 | Honda ............................. | 180/54 A |
| 3,259,752 | 7/1966 | Honda.............................. | 181/33 K |
| 2,019,180 | 10/1936 | Feilcke.......................... | 180/54 F X |
| 2,988,162 | 6/1961 | Hansen ............................ | 180/56 X |
| 3,249,172 | 5/1966 | DeLorean........................ | 180/69 R |

FOREIGN PATENTS OR APPLICATIONS

| | | | |
|---|---|---|---|
| 178,553 | 5/1954 | Austria............................ | 180/54 A |

Primary Examiner—Kenneth H. Betts
Assistant Examiner—David M. Mitchell

[57] ABSTRACT

A riding gasoline engine powered lawn mower with a noise abating hood enclosing the engine, an air passage in the hood leading from a screened inlet in an outside wall thereof to the inlet of the blower housing of the engine to bring outside air to the blower, which upon being conducted by the blower housing over the hot surfaces of the engine is discharged through a port in the deck of the mower, and air for combustion is supplied to the air cleaner of the engine carburetor from a zone inside the blower housing where the air is fresh and clean, while the engine exhaust is piped to a muffler outside the hood.

4 Claims, 6 Drawing Figures

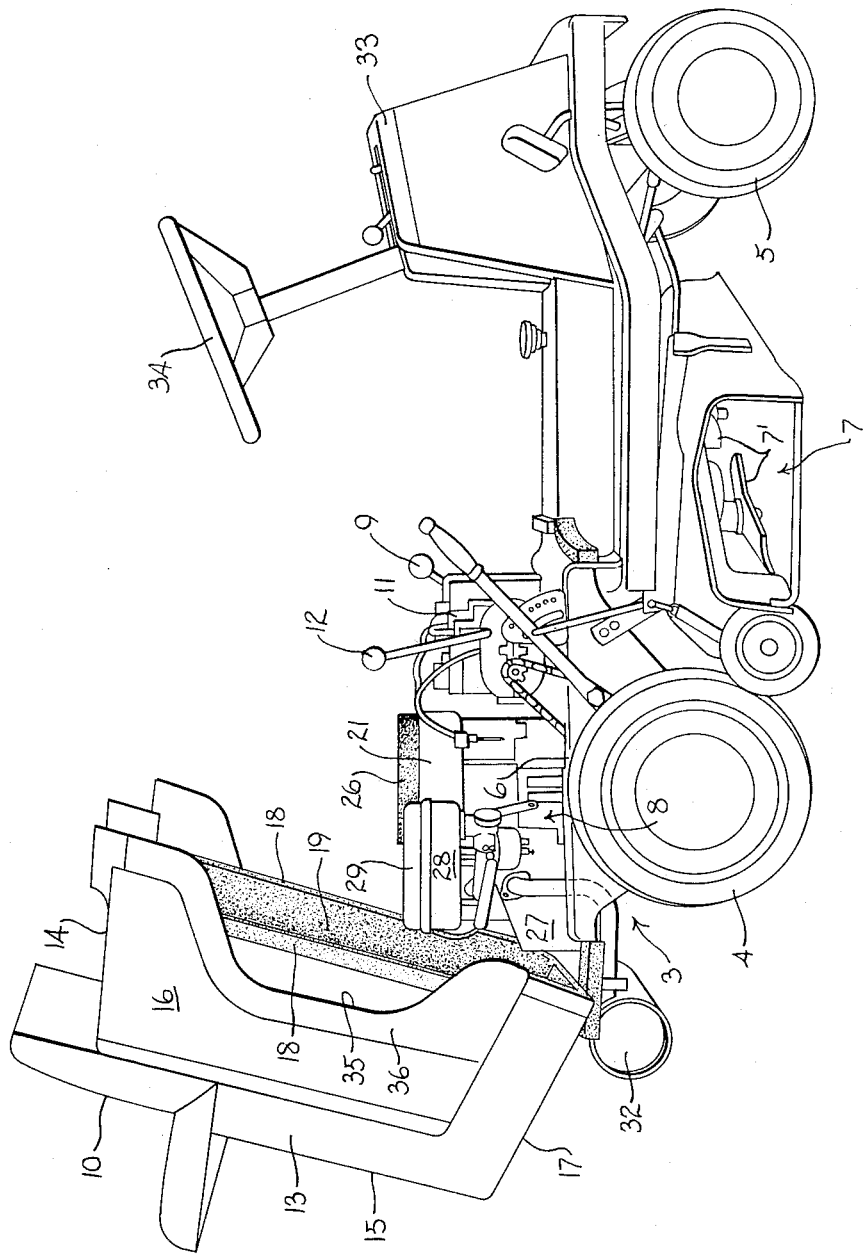

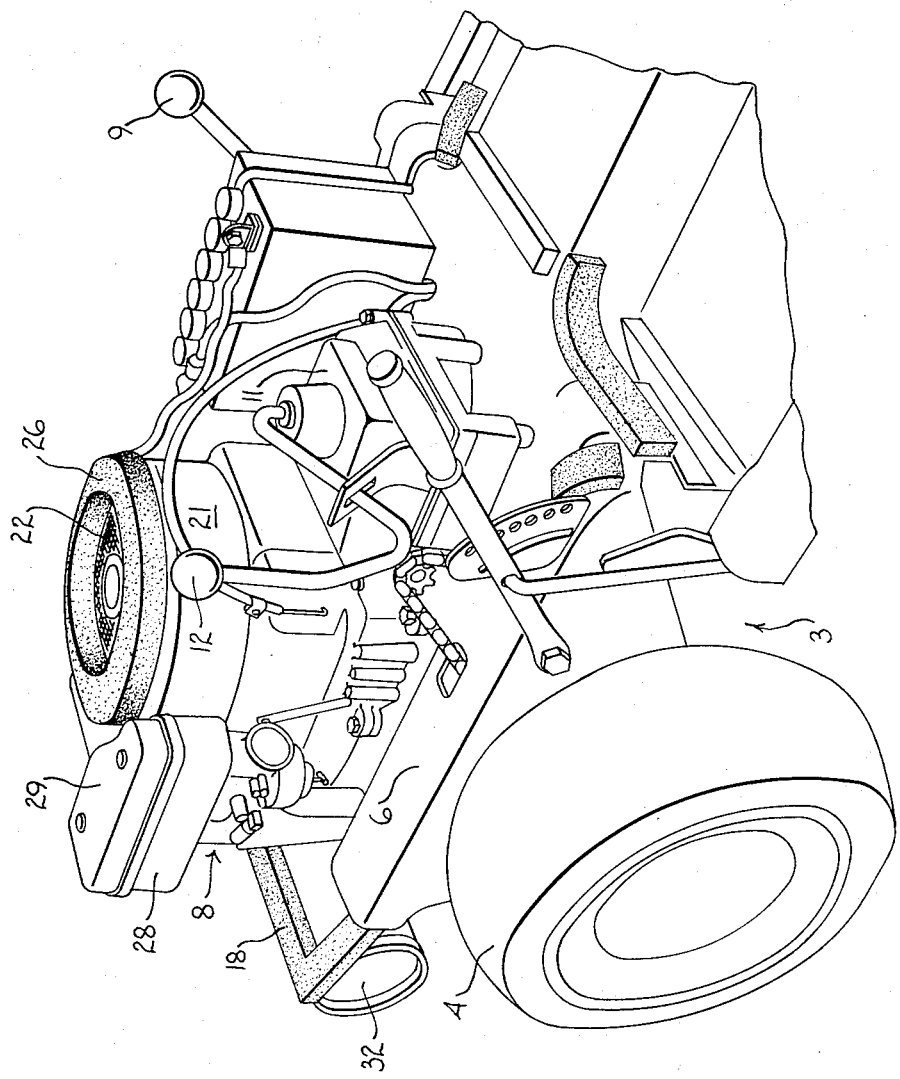

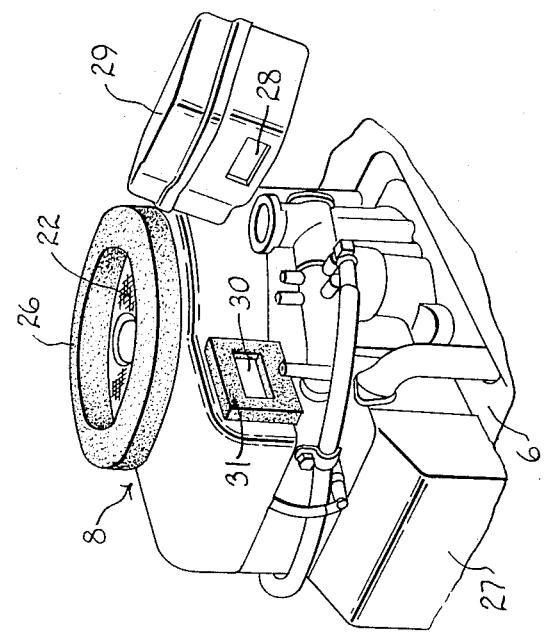
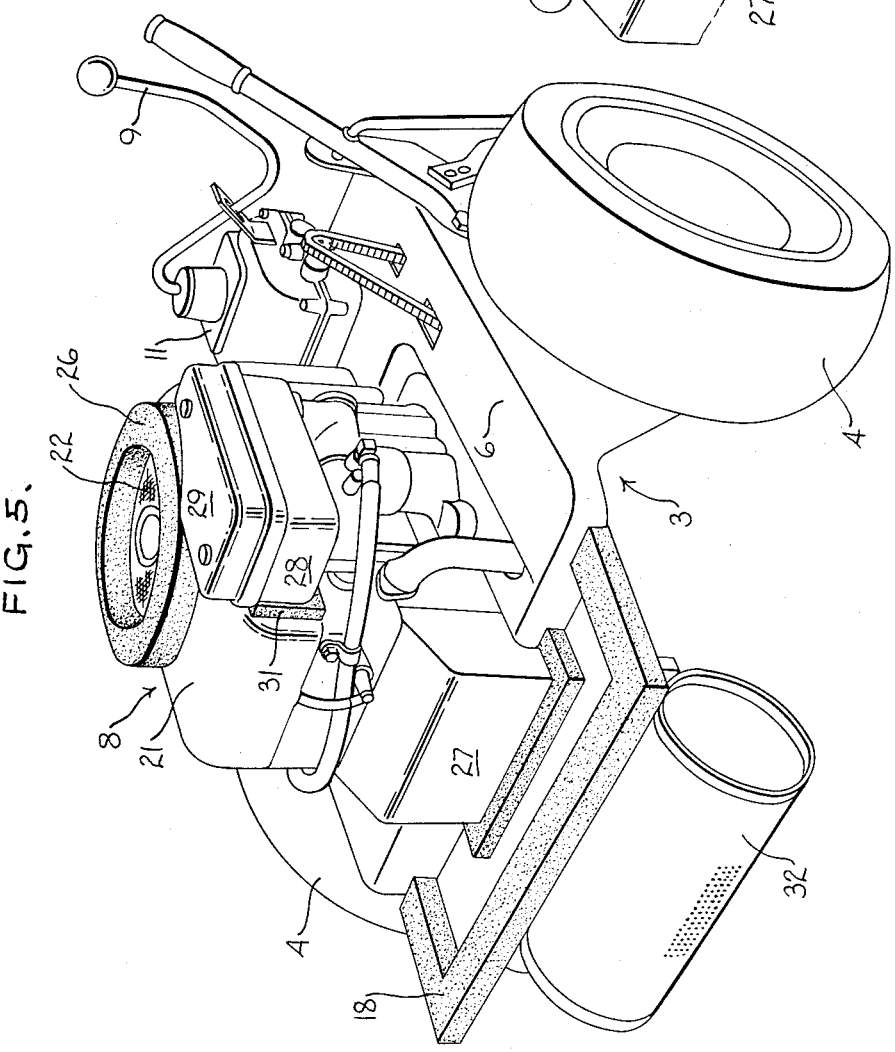

RIDING TRACTOR WITH ENGINE ENCLOSURE FOR NOISE ABATEMENT

This invention relates to gasoline engine powered riding type lawn mowers, garden tractors and similar vehicles — such as golf carts like the one forming the subject matter of the U.S. Pat. No. 3,147,814 to Suhre.

The object and purpose of the invention is to reduce the level of the noise that attends the operation of such gasoline engine powered equipment. To that end, the invention contemplates an improved manner of enclosing the engine and circulating cooling air over its hot surfaces.

Also, with a view to preventing overheating of the engine, the invention contemplates an improved air induction system for supplying clean cool air to the engine carburetor despite the complete enclosure of the engine.

With the above and other objects in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 3 is a side view of the vehicle with the hood of its engine enclosure lifted;

FIG. 4 is a perspective view of the rear portion of the vehicle chassis and the engine thereon, with the hood omitted;

FIG. 5 is a perspective view of the rear portion of the vehicle chassis, also with the hood omitted but taken from the rear; and FIG. 6 is a perspective view of part of the structure shown in FIG. 5, but with the air cleaner of the engine detached and held adjacent to its normal position.

Figure 1:
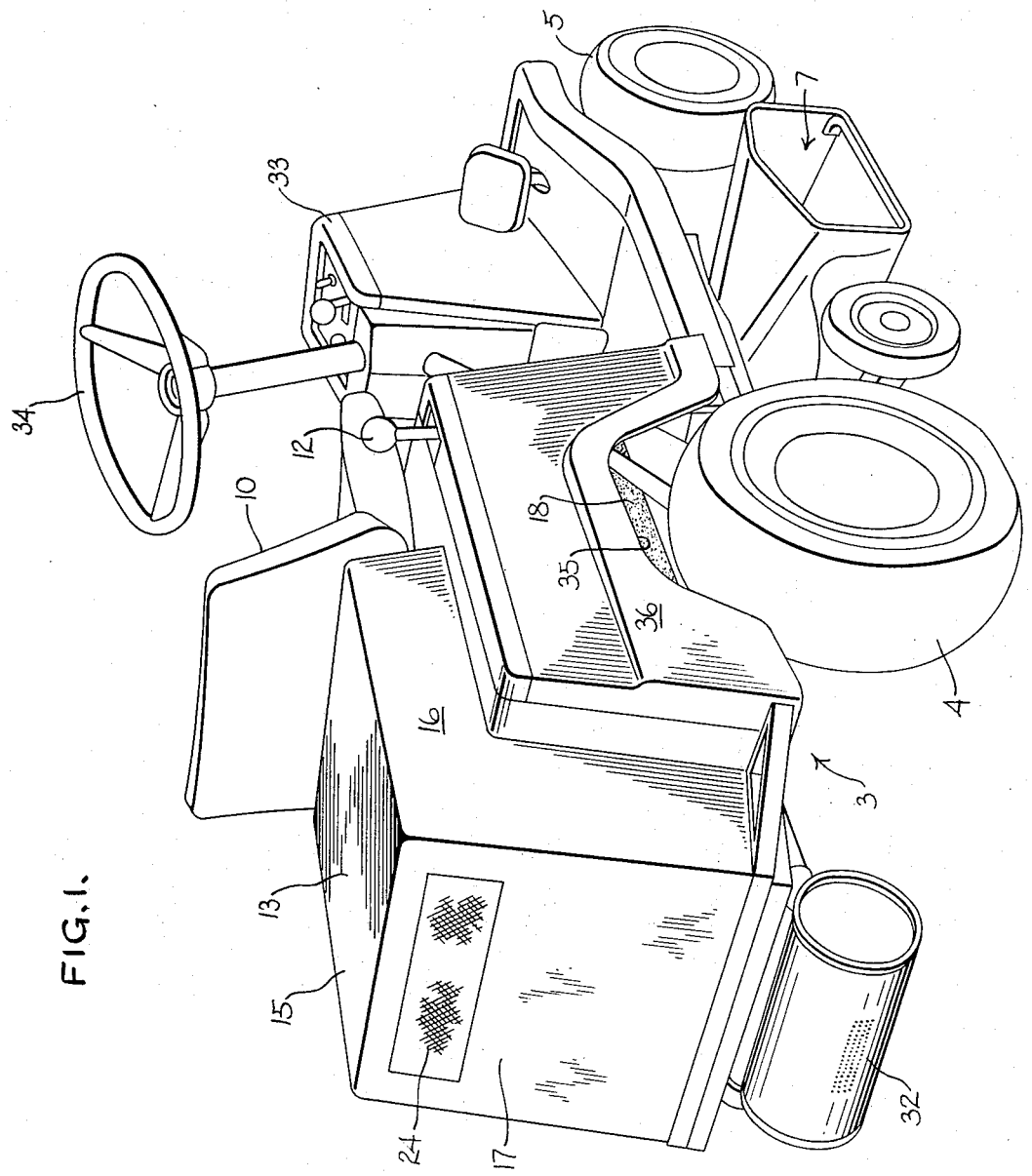
FIG. 1 is a perspective view of a riding type vehicle, specifically a power lawn mower, embodying this invention.
Figure 2:
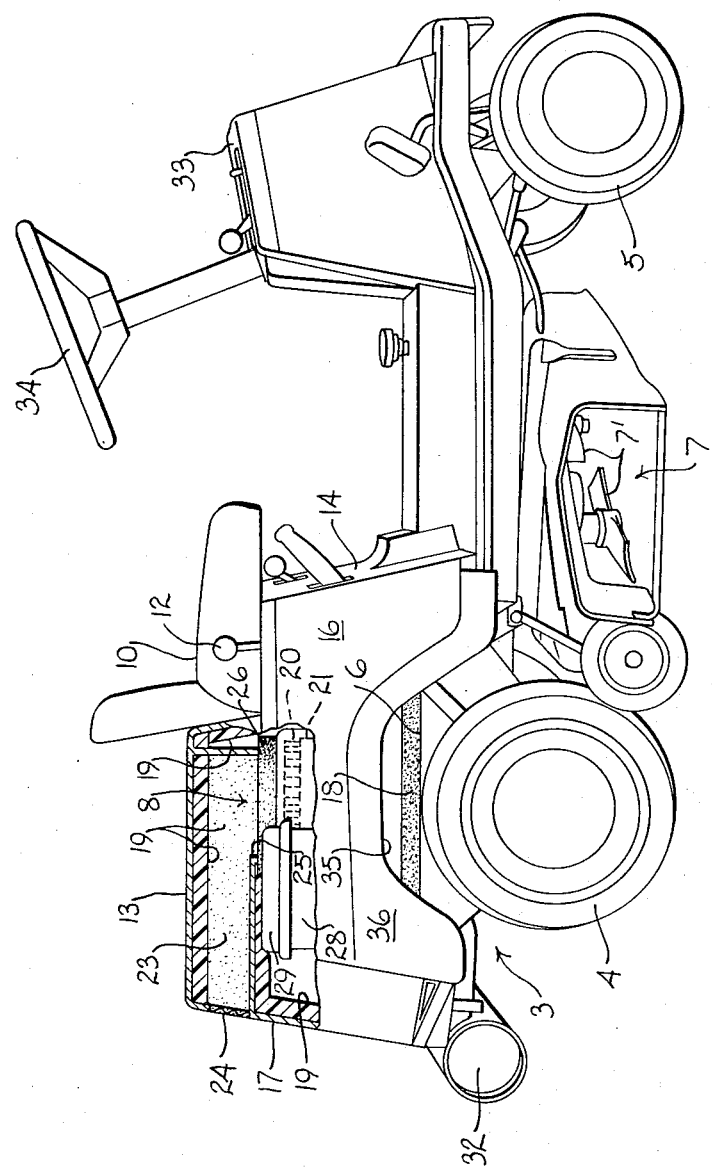
FIG. 2 is a side view thereof with parts broken away and in section.

Referring to the drawings, the numeral 3 designates the chassis of a riding type power lawn mower, which — as is customary — has driven rear wheels 4 and steerable front wheels 5. Beneath the substantially horizontal deck 6 of the chassis and between its front and rear wheels is a rotary mower, indicated generally by the numeral 7. As is customary, the mower has one or more cutter blades 7' that are driven by an engine 8.

The engine is of the vertical crankshaft type and is mounted on the deck 6 with its crankshaft projecting downwardly through the deck to be drivingly connected with the cutter blade or blades of the mower through a transmission (not shown) but controlled by a lever 9 that is readily accessible to the operator or driver who sits on a seat 10 located forwardly of the engine. Another transmission 11 that is controlled by a lever 12 drivingly connects the rear wheels 4 with the engine.

The seat 10 is mounted on the forward portion of a hood 13 that covers the engine and has its bottom edges setting on the deck 6. The hood, which may be made of metal, fiberglass or any other suitable material, has a front wall 14, a top wall 15, side walls 16 and a rear wall 17. The bottom edges of the front, side and rear walls are shaped to conform to the adjacent portions of the deck and preferably a yieldable seal 18 is interposed between the top of the deck and the bottom edges of the hood.

The hood thus coacts with the deck to provide a complete enclosure for the engine; and to achieve most effective noise reduction, all inside walls of the hood are lined with sound attenuating material which may be a relatively thick layer 19 of polyurethane foam.

Since access to the engine is necessary, the hood can be detachably connected to the deck so that it may be bodily lifted therefrom or, as in the present case, hinged to the rear portion of the deck.

As is customary, an air impeller or blower 20 that forms part of the engine flywheel draws air into a blower housing or shroud 21 which directs the cooling air over the hot surfaces of the engine. The air enters the inlet 22 of the blower housing or shroud through a duct 23 which extends rearwardly of the engine directly under the top wall of the hood to a screened air inlet opening 24 in the upper portion of its rear wall 17. The bottom, side and front end walls of the duct may be formed in any desired way, but preferably the top wall of the hood forms the top of the duct.

A hole 25 in the bottom wall of the duct 23 aligns with the inlet 22 of the blower housing or shroud, and a ring 26 of polyurethane foam interposed between the top wall of the blower housing and the bottom wall of the duct provides a relatively air-tight connection between the duct and the blower housing when the hood is in its operative position. Accordingly, the engine cooling air entering the blower housing is not affected by the temperature inside the hood, and to avoid heating the hood interior by the heat abstracted from the engine, the discharge end of the blower housing or shroud has an extension 27 which discharges below the deck.

Like the engine cooling air, the air for combustion comes from outside the engine enclosure. This is accomplished by communicating the interior of the blower housing or shroud 21 with a plenum chamber 28 mounted at the underside of an air cleaner 29 through which the air reaches the engine carburetor. The air cleaner is like that of the L. J. Lechtenberg U.S. Pat. No. 2,999,562, modified only to the extent of attaching a pan across the bottom thereof to provide the plenum chamber 28. To assure the combustion air being cool, the duct 30 communicating the air cleaner and blower housing opens to the latter at a location not too far from its inlet, and since the air cleaner must be periodically removed and cleaned, the junction between the duct 30 and the blower housing has a gasket 31 of polyurethane foam (FIG. 6).

The exhaust gases issuing from the engine are piped to a muffler 32 mounted under the rear portion of the deck.

The gas tank of the engine, which is not shown, can be located in any convenient place on the chassis, but for the sake of safety, it should be outside the engine enclosure. Thus, for instance, it could be located in the console 33 at the front of the chassis, upon which the steering wheel 34 is mounted and also the ignition switch which controls the electric starting system of the engine.

To improve the appearance of the vehicle, the side walls of the hood have wheel wells or pockets 35 formed thereon, the outer walls 36 of which are shaped to embrace the rear wheels 6, and preferably sound deadening material of any conventional type covers the inside surfaces of the wheel wells.

Those skilled in the art will appreciate that the invention can be embodied in forms other than as herein disclosed for purposes of illustration.

The invention is defined by the following claims:

I claim:

1. A wheeled vehicle driven by an air-cooled internal combustion engine, characterized by the fact that the engine is enclosed for noise abatement, without interfering with proper cooling of the engine, and comprising the combination of:
   A. a wheel-supported chassis having a generally horizontal deck upon which the engine is mounted, the engine having a vertically oriented crankshaft and an air directing shroud with an upwardly facing inlet and a downwardly facing outlet and by which engine cooling air is conducted over the hot surfaces of the engine,
   B. an engine enclosure including a hood mounted on the deck, said hood having a top wall and completely enclosing the engine and the inner walls of the hood being lined with sound absorbing material;
   C. a screened air inlet opening in one of the walls of the hood;
   D. wall means inside the engine enclosure coacting with the top wall of the hood to form an air passage leading directly from said screened air inlet opening to the upwardly facing inlet of the air directing shroud;
   E. duct means inside the engine enclosure leading from the downwardly facing outlet of the air directing shroud to a zone outside the engine enclosure;
   F. a single air impeller driven by the engine and positioned to induce a flow of engine cooling air from said screened air inlet opening, through said air passage and into and out of said duct means; and
   G. exhaust duct means leading from the exhaust port of the engine to a muffler outside the engine enclosure.

2. The wheeled vehicle of claim 1, further characterized in that the engine has an air cleaner through which air for combustion reaches the engine carburetor,
   said air cleaner having a plenum chamber communicating with and providing the sole access to the inlet of the air cleaner,
   and duct means communicating said plenum chamber with said air directing shroud.

3. The wheeled vehicle of claim 1, further characterized in that said duct means from the outlet of the air directing shroud discharges through a hole in the deck.

4. The wheeled vehicle of claim 1, further characterized by a ring of resiliently deformable material clamped between the marginal edge portions of the inlet of the air directing shroud and the outlet of the air passage.

* * * * *